US008478798B2

(12) United States Patent
Uhrhane et al.

(10) Patent No.: US 8,478,798 B2
(45) Date of Patent: Jul. 2, 2013

(54) FILESYSTEM ACCESS FOR WEB APPLICATIONS AND NATIVE CODE MODULES

(75) Inventors: Eric J. Uhrhane, San Francisco, CA (US); Matthew Papakipos, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 410 days.

(21) Appl. No.: 12/427,208

(22) Filed: Apr. 21, 2009

(65) Prior Publication Data

US 2010/0121893 A1 May 13, 2010

Related U.S. Application Data

(60) Provisional application No. 61/113,062, filed on Nov. 10, 2008.

(51) Int. Cl.
*G06F 12/00* (2006.01)

(52) U.S. Cl.
USPC .......................................... 707/822

(58) Field of Classification Search
None
See application file for complete search history.

(56) References Cited

U.S. PATENT DOCUMENTS

| 7,533,137 | B1 * | 5/2009 | Timpanaro-Perrotta et al. ...... 1/1 |
| 7,783,665 | B1 * | 8/2010 | Tormasov et al. ............ 707/783 |
| 7,966,599 | B1 | 6/2011 | Malasky et al. |
| 2002/0095479 | A1 | 7/2002 | Schmidt |
| 2004/0034623 | A1 | 2/2004 | Salmen |
| 2007/0256055 | A1 * | 11/2007 | Herscu ......................... 717/115 |
| 2009/0282474 | A1 | 11/2009 | Chen et al. |
| 2009/0282477 | A1 | 11/2009 | Chen et al. |
| 2010/0100823 | A1 * | 4/2010 | Ewe et al. ..................... 715/733 |

FOREIGN PATENT DOCUMENTS

| WO | 2006134023 A1 | 12/2006 |
| WO | 2008055010 A1 | 5/2008 |

OTHER PUBLICATIONS

Translation of Chinese Office Action in Chinese Patent Application No. 200980150260.4, dated Dec. 3, 2012. 6 Pages.
Opera Software. *File I/O API for Widgets*. Dev.Opera Beta. Published May 15, 2008. Accessed Feb. 20, 2013. Retrieved from the internet: URL:< http://web.archive.org/web/20080906235714/http://dev.opera.com/articles/view/file-i-o-api-for-widgets/>. 4 Pages.

* cited by examiner

*Primary Examiner* — Truong Vo
(74) *Attorney, Agent, or Firm* — Fish & Richardson P.C.

(57) ABSTRACT

One embodiment provides a system that facilitates the execution of a web application. During operation, the system allocates a storage space on one or more storage devices for use by the web application. Next, the system creates, for the web application, a private filesystem comprising a private root directory within the storage space. Finally, the system enables access to the private filesystem for the web application through the private root directory in a manner that does not allow access to a host filesystem associated with the one or more storage devices from the web application.

32 Claims, 3 Drawing Sheets

FILESYSTEM ACCESS FOR WEB APPLICATIONS AND NATIVE CODE MODULES

RELATED APPLICATION

This application hereby claims priority under 35 U.S.C. §119 to U.S. Provisional Application No. 61/113,062, entitled "Client-Side System for Web Applications," by Eric Uhrhane and Matthew Papakipos, filed on 10 Nov. 2008. The subject matter of this application is also related to the subject matter in a co-pending non-provisional application by inventors J. Bradley Chen, Matthew T. Harren, Matthew Papakipos, David C. Sehr, and Bennet S. Yee, entitled "Method for Validating an Untrusted Native Code Module," having Ser. No. 12/117,634, and filing date 8 May 2008. The subject matter of this application is additionally related to the subject matter in a co-pending non-provisional application by inventors J. Bradley Chen, Matthew T. Harren, Matthew Papakipos, David C. Sehr, Bennet S. Yee, and Gregory Dardyk, entitled "Method for Safely Executing an Untrusted Native Code Module on a Computing Device," having Ser. No. 12/117,650, and filing date 8 May 2008.

BACKGROUND

1. Field

The present embodiments relate to techniques for executing web applications. More specifically, the present embodiments relate to a method and system for providing filesystem access to web applications and native code modules.

2. Related Art

Computer systems may include a number of native applications that perform a variety of tasks for users. Such native applications may include word processors, email clients, media players, image or signal processing modules, and/or web browsers. To run efficiently, native applications are often written in a combination of general purpose programming languages such as C or C++ and low-level languages such as assembly language. Furthermore, native applications may have access to system resources such as graphics hardware, sound cards, filesystems, and/or network resources. Consequently, native applications may provide computationally intensive and/or resource-specific features to users of computer systems on which the native applications are installed. However, the low-level nature of native applications may restrict the applications to specific platforms, incur a lengthy installation process, and/or pose a security risk.

On the other hand, web applications, which have become more prevalent in recent years, are typically written in scripting languages that are more secure and require no installation. However, web applications may lack the performance capabilities of native applications. In particular, a web application may run one or two orders of magnitude more slowly than a native application. Furthermore, web applications are often unable to access low-level system resources that are available to native applications. As a result, web applications may be unable to implement certain features that are available in native applications.

Hence, what is needed is a technique for enabling native performance and functionality in web applications without compromising the security of the web applications.

SUMMARY

One embodiment provides a system that facilitates the execution of a web application. During operation, the system allocates a storage space on one or more storage devices for use by the web application. Next, the system creates, for the web application, a private filesystem comprising a private root directory within the storage space. Finally, the system enables access to the private filesystem for the web application through the private root directory in a manner that does not allow access to a host filesystem associated with the one or more storage devices from the web application.

In some embodiments, the system also restricts access to the private filesystem from a source which is external to the web application.

In some embodiments, restricting access to the private filesystem from the source involves preventing access to the private filesystem outside of a domain associated with the web application and managing access to the private filesystem from one or more native code modules within the domain.

In some embodiments, managing access to the private filesystem from the one or more native code modules involves enforcing a set of access permissions to the private filesystem for each of the native code modules.

In some embodiments, one or more of the access permissions are passed between the native code modules.

In some embodiments, the system also enforces a size limit for the private filesystem.

In some embodiments, enforcing the size limit for the private filesystem involves periodically monitoring a size of the storage space during access to the private filesystem by the web application and performing a remedial action if the size of the storage space exceeds the size limit.

In some embodiments, performing the remedial action involves at least one of updating the size limit, restricting write privileges to the private filesystem by the web application, notifying a user of the web application, and terminating the web application.

In some embodiments, the private filesystem is implemented using a relational database associated with the web application.

BRIEF DESCRIPTION OF THE FIGURES

In the figures, like reference numerals refer to the same figure elements.

DETAILED DESCRIPTION

Figure 1:
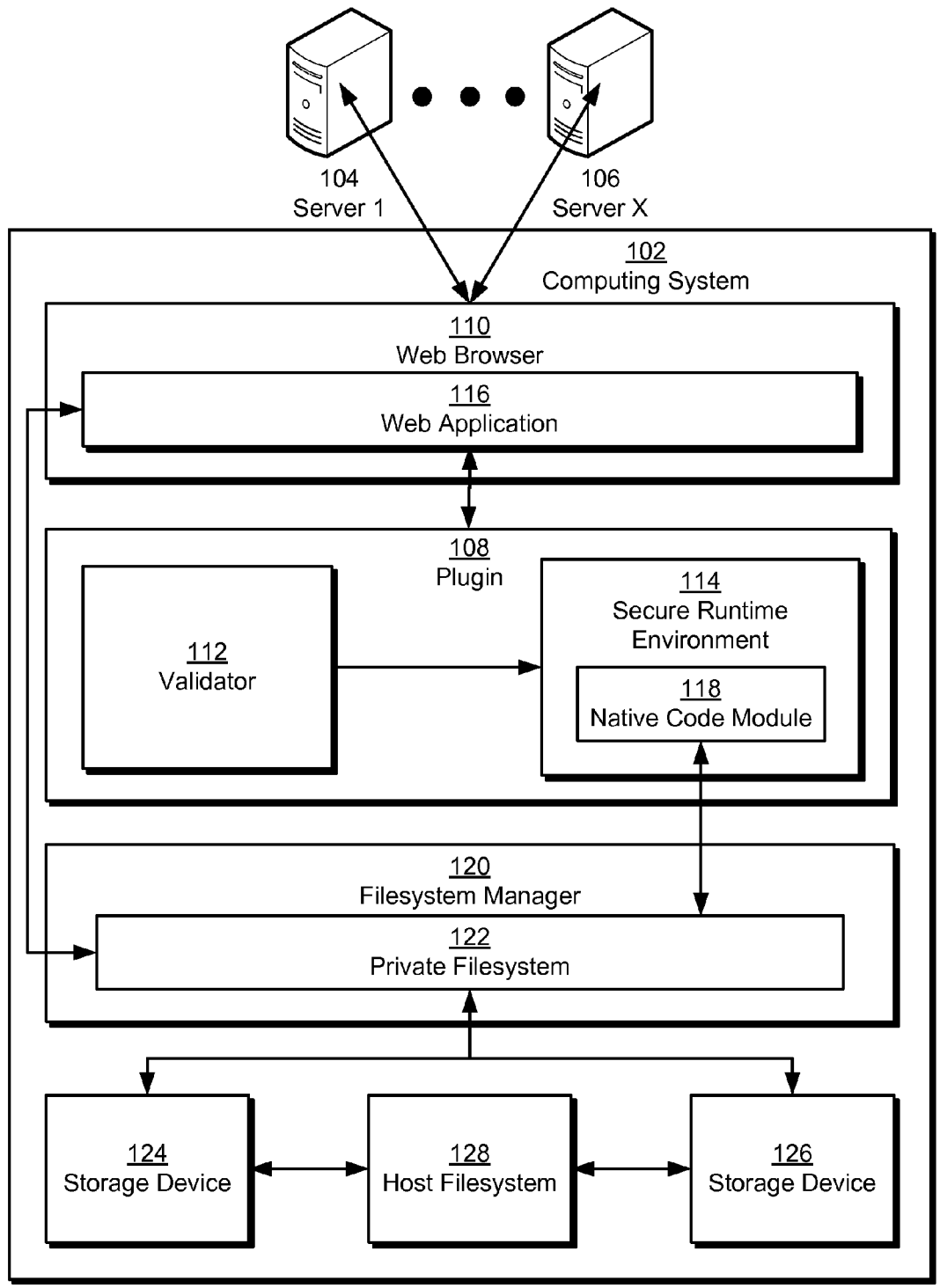
FIG. 1 shows a schematic of a system.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for facilitating the execution of a web application. The web application may be loaded in a web browser and executed on a computing system such as a personal computer (PC), a mobile phone, a personal digital assistant (PDA), a graphing calculator, a portable media player, a global positioning system (GPS) receiver, and/or another electronic computing device. The web application may be obtained by the computing system from a server using a network connection with the server. For example, the web application may be downloaded over the Internet from a website.

More specifically, embodiments provide a method and system for providing filesystem services to the web application. The filesystem services may be provided by allocating a storage space on one or more storage devices for use by the web application and creating a private filesystem within the storage space. Access to the private filesystem for the web application may then be enabled through a private root directory in the private filesystem without allowing access to a host filesystem associated with the one or more storage devices from the web application. In addition, a size limit may be enforced for the private filesystem, while access to the private filesystem may be restricted for sources that are external to the web application.

FIG. 1 shows a schematic of a system. The system includes a computing system 102 and a set of servers (e.g., server 1 104, server x 106). Computing system 102 includes a web application 116 running within a web browser 110, a plugin 108, a filesystem manager 120, a set of storage devices 124-126, and a host filesystem 128. Each of these components is described in further detail below.

Computing system 102 may correspond to an electronic device that provides one or more services or functions to a user. For example, computing system 102 may operate as a mobile phone, personal computer (PC), global positioning system (GPS) receiver, portable media player, personal digital assistant (PDA), and/or graphing calculator. In addition, computing system 102 may include an operating system (not shown) that coordinates the use of hardware and software resources on computing system 102, as well as one or more applications (e.g., web browser 110, web application 116) that perform specialized tasks for the user. For example, computing system 102 may include applications such as an email client, address book, document editor, web browser 110, and/or media player. To perform tasks for the user, applications may obtain the use of hardware resources (e.g., processor, memory, I/O components, network interface card, graphics-processing unit (GPU), storage devices 124-126, etc.) on computing system 102 from the operating system, as well as interact with the user through a hardware and/or software framework provided by the operating system, as described below.

In one or more embodiments, computing system 102 includes functionality to obtain and/or execute applications using a network connection. In particular, computing system 102 may obtain web application 116 from one or more servers (e.g., server 1 104, server x 106) using a network connection with the server(s) and load web application 116 in web browser 110. For example, web application 116 may be downloaded from an application server over the Internet by web browser 110.

Once loaded, web application 116 may provide features and user interactivity comparable to that of native applications on computing system 102. For example, web application 116 may function as an email client, document editor, media player, computer-aided design (CAD) system, and/or computer game. Web application 116 may also include dynamic user interface elements such as menus, buttons, windows, sub-windows, icons, animations, and/or other graphical objects that emulate analogous user interface elements in native applications. In other words, web application 116 may correspond to a rich Internet application (RIA).

Furthermore, web application 116 may execute on computing system 102 regardless of the type of platform (e.g., operating system, drivers, etc.) associated with computing system 102. Though platform-independent applications such as web application 116 may be more portable and secure than native applications, such cross-platform applications may lack certain performance capabilities of native applications.

More specifically, non-native applications such as web application 116 may be written using scripting languages that are interpreted rather than compiled, such as JavaScript (JavaScript™ is a registered trademark of Sun Microsystems, Inc.). The interpreted nature of web application 116 and/or other non-native applications may result in significantly slower execution times for the non-native applications than those of compiled native applications. Non-native applications may also be unable to utilize low-level libraries and/or application programming interfaces (API) that are available for use by native applications. Consequently, non-native applications may provide limited functionality in certain tasks.

To enable native performance for web applications, computing system 102 may obtain and execute a native code module 118 within plugin 108. Like web application 116, native code module 118 may be obtained from one or more servers (e.g., server 1 104, server x 106) by web browser 110. For example, web application 116 may provide a hyperlink to native code module 118 on the Internet. Web browser 110 may then download native code module 118 from the Uniform Resource Locator (URL) specified in the hyperlink. Alternatively, native code module 118 may be specified by the user or by an external source, such as another web application and/or a native application.

More specifically, native code module 118 may correspond to a software module containing native code that runs directly on hardware provided by computing system 102, such as a CPU. As a result, native code module 118 may be used to perform tasks that require substantial access to CPU resources on computing system 102. For example, native code module 118 may be used by web application 116 to provide computationally intensive features associated with physics simulation, signal processing, artificial intelligence, modeling, and/or analysis.

In one or more embodiments, plugin 108 includes a variety of mechanisms to ensure the safe execution of native code module 118. In particular, native code module 118 may be validated by a validator 112 provided by plugin 108 prior to execution. Native code module validation is described in a co-pending non-provisional application by inventors J. Bradley Chen, Matthew T. Harren, Matthew Papakipos, David C. Sehr, and Bennet S. Yee, entitled, "Method for Validating an Untrusted Native Code Module," having Ser. No. 12/117,634, and filing date 8 May 2008, which is incorporated herein by reference.

Once native code module 118 is validated, native code module 118 may be loaded into a secure runtime environment 114 provided by plugin 108. Native code execution in a secure runtime environment is described in a co-pending non-provisional application by inventors J. Bradley Chen, Matthew T. Harren, Matthew Papakipos, David C. Sehr, Bennet S. Yee, and Gregory Dardyk, entitled, "Method for Safely Executing an Untrusted Native Code Module on a Computing Device," having Ser. No. 12/117,650, and filing date 8 May 2008, which is incorporated herein by reference. Secure runtime environment 114 may also be provided by a web browser extension to web browser 110, and/or secure runtime environment 114 may be built into web browser 110.

Furthermore, because native code module 118 may include binary code that runs directly on hardware, native code module 118 may be platform independent with respect to the operating system of computing system 102, web browser 110, and/or other software components on computing system 102. As described in the above-referenced applications, plugin 108 and/or native code module 118 may also include mechanisms for executing on a variety of instruction set architectures, including the use of "fat binaries" and binary translators.

Those skilled in the art will appreciate that security mechanisms used to execute web application 116 and native code module 118 may preclude web application 116 and native code module 118 from accessing system services on computing system 102. In particular, the restricted execution of web application 116 and native code module 118 may prohibit access to filesystem services from web application 116 or native code module 118. For example, security restrictions may prevent web application 116 and native code module 118 from accessing host filesystem 128 on computing system 102. As a result, web application 116 and/or native code module 118 may have trouble storing, reading from, writing to, and transferring large amounts of binary data. For example, web application 116 and/or native code module 118 may have limited capacity in storing and handling files such as large images, media (e.g., audio, video, etc.), and/or game assets.

In one or more embodiments, filesystem services for web application 116 and native code module 118 are enabled by filesystem manager 120. Filesystem manager 120 may be implemented as a plugin to web browser 110, a web browser extension to web browser 110, and/or as a part of web browser 110. As shown in FIG. 1, filesystem manager 120 may create a private filesystem 122 for use by web application 116 and native code module 118. Private filesystem 122 may reside on one or more storage devices 124-126 within computing system 102 or attached to computing system 102, such as one or more hard disk drives, optical disks, volatile memory (e.g., random access memory (RAM)), and/or flash memory devices. Moreover, as described below, filesystem manager 120 may facilitate the secure execution of web application 116 and native code module 118 by isolating private filesystem 122 from host filesystem 128 and restricting access to private filesystem 122 from outside the domain of web application 116.

To provide filesystem services to web application 116, filesystem manager 120 may allocate a storage space on one or more storage devices 124-126 for use by web application 116. Storage devices 124-126 may include storage devices within computing system 102, attached to computing system 102, and/or accessible from computing system 102 through a network connection. For example, some of the storage space may be allocated in a hard disk drive on a server (e.g., server 1 104, server x 106). Filesystem manager 120 may then create private filesystem 122 within the storage space. Filesystem manager 120 may also enable access to private filesystem 122 from web application 116 through a private root directory in private filesystem 122. For example, web application 116 may execute filesystem commands such as "open," "seek," "close," "read," "write," "truncate," "mkdir," "unlink," "rmdir," "opendir," "readdir," "closedir," "mv," and "mmap" using the private root directory and a plugin interface with filesystem manager 120.

Furthermore, filesystem manager 120 may enable access to private filesystem 122 for web application 116 without allowing access to host filesystem 128 from web application 116. In other words, filesystem manager 120 may implement filesystem security by preventing web application 116 from accessing files and directories outside of private filesystem 122, including files and directories accessible to native applications in host filesystem 128 and/or private filesystems for other web applications in computing system 102.

Filesystem manager 120 may also restrict access to private filesystem 122 from sources which are external to web application 116. More specifically, filesystem manager 120 may prevent access to private filesystem 122 outside of a domain associated with web application 116. For example, filesystem manager 120 may define the domain of web application 116 as a set of webpages and/or modules (e.g., native code module 118) used by web application 116. Webpages, modules, and/or applications outside of the domain may thus be unable to access private filesystem 122 and may instead have access to their own private filesystems as provided by filesystem manager 120 and/or other filesystem mechanisms on computing system 102.

Furthermore, filesystem manager 120 may manage access to private filesystem 122 from native code module 118 and/or other modules (e.g., native code modules, plugins, etc.) within the domain of web application 116. In particular, module-based access to private filesystem 122 may be managed by enforcing a set of access permissions to private filesystem 122 for each of the modules. For example, filesystem manager 120 may separate private filesystem 122 into three regions, with each region accessible to only one of three modules within the domain of web application 116. To separate private filesystem 122 into regions, filesystem manager 120 may define each region using a separate directory within the private root directory. To enforce access permissions to the regions by the modules, filesystem manager 120 may implement "chroot" functionality by setting each of the directories as the apparent root directory for one of the modules. As a result, each module may only have access to the apparent root directory assigned to the module within private filesystem 122, as well as any subdirectories and files within the apparent root directory.

Filesystem manager 120 may further allow access permissions to be passed between modules. For example, one module may grant access to a file and/or directory from another module by passing a file descriptor for the file and/or directory to the other module. Alternatively, filesystem manager 120 may allow each module to explicitly specify access permissions to files and directories within the module's apparent root directory from other modules. For example, a module may enable read and/or write access to a directory for one or more other modules through filesystem manager 120. Apparent root directories, directories, files, and permissions in private filesystem 122 are described in further detail below with respect to FIG. 2.

Filesystem manager 120 may also provide quota management for private filesystem 122. In other words, filesystem manager 120 may enforce a size limit for private filesystem 122. The size limit may be requested by web application 116, set by the user, and/or automatically set by filesystem manager 120 based on a default size limit value for web applications. Furthermore, the size limit may be enforced by periodically monitoring a size of the storage space occupied by private filesystem 122 during access to private filesystem 122 by web application 116. If the size of the storage space exceeds the size limit, a remedial action may be performed by filesystem manager 120. For example, filesystem manager 120 may update (e.g., increase) the size limit, restrict write privileges to private filesystem 122 by web application 116, notify a user of web application 116, and/or terminate web application 116 and remove data stored in private filesystem 122. In other words, filesystem manager 120 may utilize an eventual correctness model in enforcing the size limit for private filesystem 122 to save overhead associated with checking or altering the size of the storage space.

However, filesystem manager 120 may also implement a real-time quota management system that continually monitors the size of the storage space and/or validates relevant filesystem calls (e.g., quota allocation calls) for strict conformity to the size limit if such strict conformity is warranted. For example, real-time quota management may be enabled for private filesystem 122 if a security policy for web application 116 and/or private filesystem 122 requires strict conformity to a size limit for private filesystem 122.

In one or more embodiments, filesystem manager 120 includes a coordinating mechanism for managing concurrent access to private filesystem 122 by multiple modules (e.g., web application 116, native code module 118, other modules, etc.) executing in separate processes. The coordinating mechanism may also execute as a separate process and perform tasks such as serialization of filesystem commands from multiple processes, file locking, quota allocation, and atomic file creation. In other words, the coordinating mechanism may manage interaction between the modules and private filesystem 122 if such interaction affects or is affected by the actions of other modules. For example, a module wishing to write to a new file may first obtain space for the new file from the coordinating mechanism, and then stream the data directly to private filesystem 122. Furthermore, communication between the modules and the coordinating mechanism may be facilitated by an inter-module communication (IMC) runtime that establishes IMC channels between the modules and the coordinating mechanism.

Those skilled in the art will appreciate that private filesystem 122 may be created by filesystem manager 120 in a number of ways. For example, private filesystem 122 may be created as an isolated subset of host filesystem 128. Filesystem manager 120 may thus provide filesystem commands to web application 116 and associated modules as translated, guarded pass-through versions of analogous filesystem commands used to access host filesystem 128. On the other hand, filesystem manager 120 may implement private filesystem 122 using a relational database associated with web application 116. For example, filesystem manager 120 may implement filesystem commands on top of relational database queries for accessing a relational database on computing system 102 that provides local relational data storage for web application 116.

Figure 2:
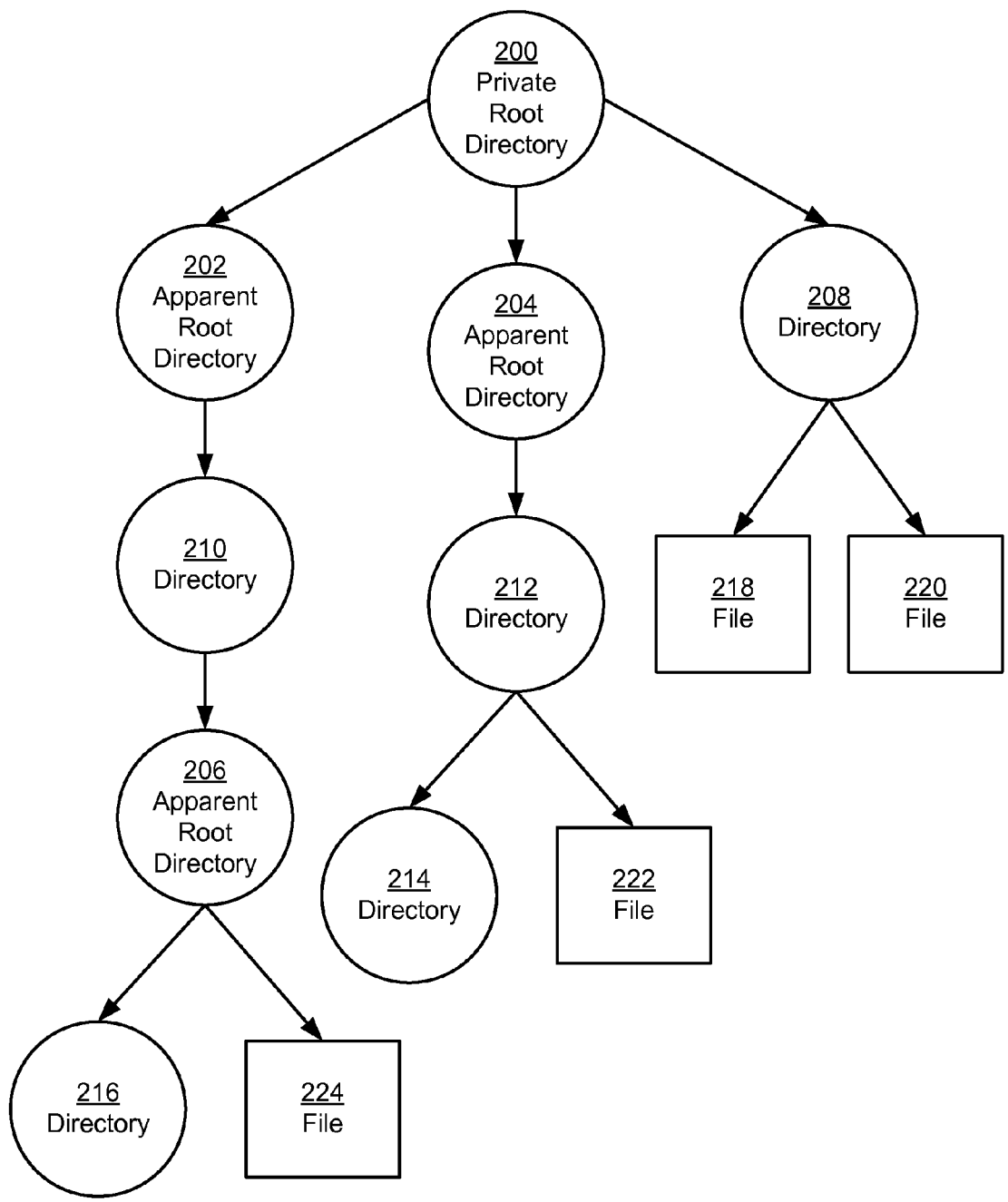
FIG. 2 shows an exemplary private filesystem.

FIG. 2 shows an exemplary private filesystem. As described above, the private filesystem may be created by a filesystem manager (e.g., filesystem manager 120 of FIG. 1) for use by a web application (e.g., web application 116 of FIG. 1) and/or other modules within the domain of the web application, such as native code modules or plugins. As shown in FIG. 2, the private filesystem includes a private root directory 200, a set of apparent root directories 202-206, a set of directories 208-216, and a set of files 218-224 organized in a tree structure.

Private root directory 200 may serve as the root of the tree structure. As a result, apparent root directories 202-206, directories 208-216, and files 218-224 may all be located underneath private root directory 200. Furthermore, private root directory 200 may serve as the access point to the private filesystem for the web application. In other words, the web application may make calls into the private filesystem by specifying a path from private root directory 200. For example, the web application may open file 218 by specifying a path such as "/mydirectory/file218.txt" as a parameter to an "open" filesystem command provided by the filesystem manager. Within the path, private root directory 200 may be represented by the first forward slash (e.g., "/"), directory 208 may be specified using "mydirectory/," and file 218 may be specified using "file218.txt." The web application may then read from or write to file 218 using a file descriptor returned by the "open" command.

As mentioned previously, the private filesystem may also be accessible to modules within the domain of the web application. Each module may further be associated with a set of access permissions to the private filesystem. In particular, each module may only have permission to access a particular region of the private filesystem as specified by the web application. In addition, the region accessible to a particular module may be represented by the apparent root directory 202-206 assigned to the module. For example, apparent root directory 204 may be assigned to a native code module associated with the web application. The native code module may access directories 212-214 and file 222 with apparent root directory 204 as the topmost directory (e.g., "/") in paths to directories 212-214 and file 222. Furthermore, the native code module may be unable to access directories and files outside of apparent root directory 204. As a result, the use of multiple apparent root directories 202-206 in the private filesystem may allow for functionality similar to the "chroot" operation for modules associated with the web application.

Similarly, access permissions for one module may be contained entirely within the accessible region for another module. For example, apparent root directory 202 may be assigned to a plugin associated with the web application. The plugin may thus have access to directory 210, apparent root directory 206, directory 216, and file 224. The plugin may also create and remove directories and files within apparent root directory 202 through filesystem commands provided by the filesystem manager. However, apparent root directory 206 may be assigned to a native code module associated with the web application. As a result, the native code module may only have access to directories and files at or below apparent root directory 206, such as directory 216 and file 224. Furthermore, changes to directory 210 and/or apparent root directory 206 may affect the native code module's access to the private filesystem. For example, the native code module may be unable to access the private filesystem if directory 210 or apparent root directory 206 were removed from the private filesystem.

Access permissions for the modules may also be updated by passing permissions between the modules. As discussed above, a module may share access to a file or directory by passing the file descriptor for the file or directory to another module. For example, a native code module to which apparent root directory 204 is assigned may share file 222 by opening file 222 and passing the returned file descriptor to a native code module to which apparent root directory 202 is assigned. Changes to access permissions may also be explicitly made by the web application and/or modules. For example, the web application may change the apparent root directory of a module to allow the module to access a different region of the private filesystem.

Modules may also have access to multiple apparent root directories within the private filesystem. For example, a module may have simultaneous access to two apparent root directories 204-206 through changes to the module's access permissions as specified by the web application and/or other modules. Upon gaining access to both root directories 204-206, the module may be required to distinguish between apparent root directory 204 and apparent root directory 206 when specifying paths within the private filesystem. For example, the module may use different names for apparent root directory 204 and apparent root directory 206 instead of the forward slash (e.g., "/") for one apparent root directory.

Figure 3:
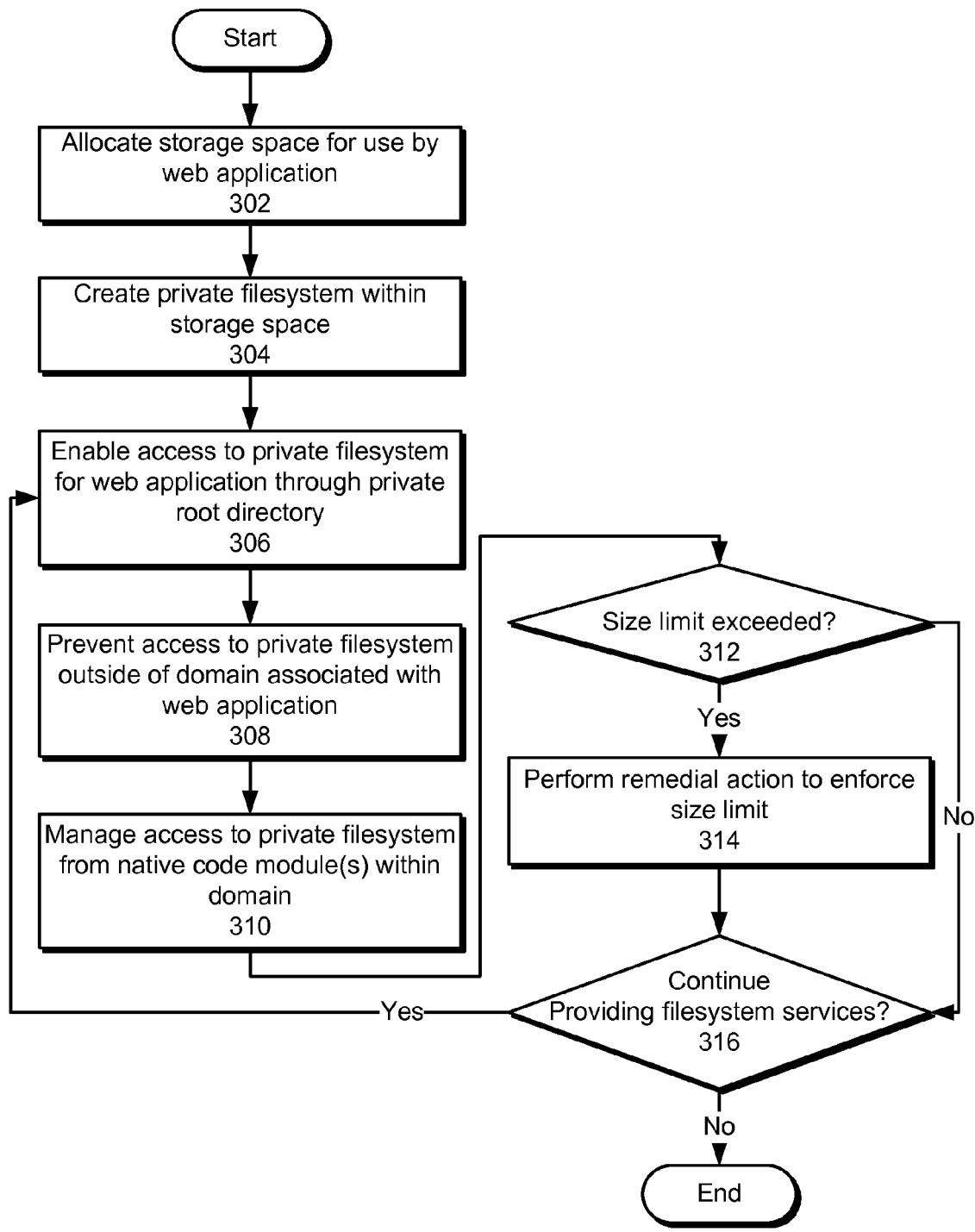
FIG. 3 shows a flowchart illustrating the process of facilitating the execution of a web application.

FIG. 3 shows a flowchart illustrating the process of facilitating the execution of a web application. In one or more embodiments, one or more of the steps may be omitted, repeated, and/or performed in a different order. Accordingly, the specific arrangement of steps shown in FIG. 3 should not be construed as limiting the scope of the technique.

Initially, a storage space is allocated for use by the web application (operation 302). The storage space may be allocated on one or more storage devices, such as hard disk drives, optical disks, and/or flash memory. The storage devices may additionally be distributed across a number of computing systems. For example, one or more storage devices may be accessed as a network drive via a network connection.

Next, a private filesystem is created within the storage space (operation 304) for the web application. The private filesystem may include a private root directory that is accessible from the web application. In other words, access to the private file system for the web application may be enabled through the private root directory (operation 306). Furthermore, because the web application may only be permitted to make filesystem calls through the private root directory, the web application may be unable to access a host filesystem associated with the storage device(s) on which the private filesystem resides. Such isolation of the private filesystem from the host filesystem may mitigate the occurrence of security exploits for both the host filesystem and the private filesystem.

Filesystem-based security may additionally be implemented by preventing access to the filesystem outside of a domain associated with the web application (operation 308). As described above, the domain of the web application may correspond to a set of webpages and modules used by the web application. For example, the domain of the web application may be defined using a tuple that includes a host, a port, and a protocol associated with the web application. Webpages included in the host, port, and protocol, as well as modules loaded by the webpages, may thus be within the domain of the web application.

Access to the private filesystem from one or more native code modules within the domain of the web application may also be managed (operation 310). In particular, module-based access to the private filesystem may be managed by enforcing access permissions to the private filesystem for each of the native code modules. The access permissions may be specified by providing functionality similar to "chroot" and assigning each native code module an apparent root directory within the private filesystem. The native code module may thus be allowed to access all subdirectories and files within the corresponding apparent root directory but may not have access to other areas of the private filesystem. However, access permissions may be passed between the native code modules by, for example, passing file descriptors, adding or removing apparent root directories for a native code module, and/or explicitly changing access permissions for a specific directory or file.

Use of the private filesystem by the web application may also be subject to a size limit for the private filesystem. In other words, quota management may be provided for the private filesystem to ensure that the size limit for the private filesystem is not exceeded (operation 312). The size limit may be requested by the web application, set by a user, and/or based on a default size limit for web applications. To enforce the size limit, the size of the storage space may periodically be monitored during access to the private filesystem by the web application. If the size limit is not exceeded, no action is required.

However, if the size of the storage space exceeds the size limit, a remedial action is performed to enforce the size limit (operation 314). The remedial action may involve updating the size limit, restricting write privileges to the private filesystem by the web application and associated native code modules, notifying a user of the web application, and/or terminating the web application. For example, if the size limit is exceeded, a user of the web application may be notified and prompted for the remedial action to be taken (e.g., terminating the web application, adjusting the size limit on a temporary or permanent basis, pausing the web application, etc.). As a result, the size limit may be enforced based on an eventual correctness model. Alternatively, real-time quota management may be implemented by continuously monitoring the size of the storage space for conformity to the size limit, by checking the size of the storage space before and after relevant filesystem calls (e.g., quota allocation calls), and/or by validating the arguments of relevant filesystem calls.

Filesystem services may continue to be provided to the web application (operation 316). For example, the private filesystem may be available to the web application as long as the private filesystem stays within the size limit and security constraints associated with the private filesystem are met. The private filesystem may also persist between invocations of the web application. If filesystem services are to be provided, access to the private filesystem is enabled for the web application (operation 306) while access to the private filesystem is restricted from sources that are external to the web application (operations 308-310). The size limit for the private filesystem may also be enforced (operations 312-314) during use of the private filesystem by the web application. Filesystem services may continue to be provided until the private filesystem is no longer used by the web application and/or the web application has violated the size limit or a security constraint associated with the private filesystem. For example, access to the private filesystem from the web application may be terminated if the web application attempts to undermine the host filesystem, operating system, and/or underlying hardware using spurious filesystem calls to the private filesystem.

The foregoing descriptions of various embodiments have been presented only for purposes of illustration and description. They are not intended to be exhaustive or to limit the present embodiments to the forms disclosed. Accordingly, many modifications and variations will be apparent to practitioners skilled in the art. Additionally, the above disclosure is not intended to limit the present embodiments.

What is claimed is:

1. A computer-implemented method for providing filesystem services to a web application on a computing system, comprising:
    allocating a filesystem storage space on one or more storage devices for use by the web application;
    creating, for the web application, a private filesystem comprising a private root directory within the filesystem storage space;
    providing a programmatic interface on the computing system for use by code of the web application and through which the web application accesses the private filesystem; and
    managing filesystem access according to filesystem security criteria, wherein the filesystem security criteria include web application-specific criteria that allow the web application to access the private filesystem through the private root directory and do not allow the web application to access a host filesystem associated with the one or more storage devices, and wherein managing the filesystem access according to the filesystem security criteria includes:
        allowing access from a first module used by the web application to a file in a first region within the private filesystem and preventing access from the first module to a file in any other region within the private filesystem, and
        allowing access from a different, second module used by the web application to a file in a different, second region within the private filesystem and preventing access from the second module to a file in any other region within the private filesystem.

2. The computer-implemented method of claim 1, wherein managing the filesystem access according to the filesystem security criteria further includes:
    preventing access to the private filesystem from a source that is outside a domain associated with the web application, wherein the domain of the web application corresponds to a set of webpages and modules used by the web application, and wherein the source that is outside the domain of the web application is a webpage or a module that is not used by the web application.

3. The computer-implemented method of claim 2, wherein the domain of the web application is defined using a tuple that includes a host, a port, and a protocol associated with the web application.

4. The computer-implemented method of claim 1, wherein managing the filesystem access according to the filesystem security criteria further includes:
    managing the filesystem access to the private filesystem from one or more native code modules within a domain of the web application by enforcing respective access permissions to the private filesystem for each of the native code modules.

5. The computer-implemented method of claim 4, wherein enforcing the respective access permissions to the private filesystem for each of the native code modules comprises:
    allowing a first native code module to access a first region of the private filesystem that is assigned to the first native code module and preventing the first native code module from accessing any other region of the private filesystem; and
    allowing a different, second native code module to access a second region of the private filesystem that is assigned to the second native code module and preventing the second native code module from accessing any other region of the private filesystem.

6. The computer-implemented method of claim 1, wherein the programmatic interface is a script-based interface that enables the web application to access a file in the private filesystem directly through the private root directory of the private filesystem by specifying a path to the file from the private root directory.

7. The computer-implemented method of claim 1, wherein the web application is executing on an operating system with a native application and wherein the method further comprises:
    providing a different programmatic interface through which the native application accesses the host filesystem.

8. The computer-implemented method of claim 1, further comprising:
    persisting the private filesystem within the filesystem storage space between invocations of the web application on the computing system.

9. The computer-implemented method of claim 1, wherein the programmatic interface is the only interface on the computing system through which the web application accesses the private filesystem.

10. The computer-implemented method of claim 1, wherein managing the filesystem access according to the filesystem security criteria further includes:
    allowing access from a different, third module to the file in the first region, allowing access from the third module to a file in a different, third region within the private filesystem and preventing access from the third module to a file in any region other than the first region and the third region within the private filesystem.

11. The computer-implemented method of claim 1, further comprising:
    defining a plurality of regions within the private filesystem, wherein the plurality of regions includes the first region and the second region, and wherein each region is defined using a respective apparent root directory;
    associating the first module with the first region, wherein the first region is defined using a first apparent root directory; and
    associating the second module with the second region, wherein the second region is defined using a second apparent root directory,
    wherein allowing access from the first module includes allowing access to the file in the first region through the first apparent root directory, and
    wherein allowing access from the second module includes allowing access to the file in the second region through the second apparent root directory.

12. A system for providing filesystem services to a web application, comprising:
    a processor;
    one or more storage devices coupled to the processor; and
    a file system manager executed by the processor, wherein the file system manager is configured to perform a method comprising:
        allocating filesystem storage space on the one or more storage devices for use by the web application;

creating, for the web application, a private filesystem comprising a private root directory within the filesystem storage space;

providing a programmatic interface on the system for use by the web application and through which the web application accesses the private filesystem; and managing filesystem access according to filesystem security criteria, wherein the filesystem security criteria include web application-specific criteria that allow the web application to access the private filesystem through the private root directory and do not allow the web application to access a host file system associated with the one or more storage devices, and wherein managing the filesystem access according to the filesystem security criteria includes:

allowing access from a first module used by the web application to a file in a first region within the private filesystem and preventing access from the first module to a file in any other region within the private filesystem, and allowing access from a different, second module used by the web application to a file in a different, second region with the private filesystem and preventing access from the second module to a file in any other region within the private filesystem.

13. The system of claim 12, wherein managing the filesystem access further includes:

preventing access to the private filesystem from a source that is outside a domain associated with the web application, wherein the domain of the web application corresponds to a set of webpages and modules used by the web application, and wherein the source that is outside the domain of the web application is a webpage or a module that is not used by the web application.

14. The system of claim 13, wherein the domain of the web application is defined using a tuple that includes a host, a port, and a protocol associated with the web application.

15. The system of claim 12, wherein the method further comprises:

managing the filesystem access to the private filesystem from one or more native code modules within a domain of the web application by enforcing respective access permissions to the private filesystem for each of the native code modules.

16. The system of claim 15, wherein enforcing the respective access permissions to the private filesystem for each of the native code modules comprises:

allowing a first native code module to make system calls to access a first region of the private filesystem that is assigned to the first native code module and preventing the first native code module from accessing any other region of the private filesystem; and allowing a different, second native code module to access a second region of the private filesystem that is assigned to the second native code module and preventing the second native code module from accessing any other region of the private filesystem.

17. The system of claim 12, wherein the programmatic interface is a script-based interface that enables the web application to access a file in the private filesystem directly through a private root directory of the private filesystem by specifying a path to the file from the private root directory.

18. The system of claim 12, wherein the web application is executing on an operating system with a native application and wherein the method further comprises:

providing a different programmatic interface through which the native application accesses the host filesystem.

19. The system of claim 12, wherein the method further comprises:

persisting the private filesystem within the filesystem storage space between invocations of the web application on the system.

20. The system of claim 12, wherein the programmatic interface is the only interface on the system through which the web application accesses the private filesystem.

21. The system of claim 12, wherein managing the filesystem access according to the filesystem security criteria further includes:

allowing access from a different, third module to the file in the first region, allowing access from the third module to a file in a different, third region within the private filesystem and preventing access from the third module to a file in any region other than the first region and the third region within the private filesystem.

22. The system of claim 12, wherein the method further comprises:

defining a plurality of regions within the private filesystem, wherein the plurality of regions includes the first region and the second region, and wherein each region is defined using a respective apparent root directory;

associating the first module with the first region, wherein the first region is defined using a first apparent root directory; and associating the second module with the second region, wherein the second region is defined using a second apparent root directory, wherein allowing access from the first module includes allowing access to the file in the first region through the first apparent root directory, and wherein allowing access from the second module includes allowing access to the file in the second region through the second apparent root directory.

23. A computer-readable storage medium storing instructions that when executed by a computer cause the computer to perform a method for providing filesystem services to a web application on the computer, the method comprising:

allocating a filesystem storage space on one or more storage devices for use by the web application;

creating, for the web application, a private filesystem comprising a private root directory within the filesystem storage space;

providing a programmatic interface on the computer for use by the web application and through which the web application accesses the private filesystem;

managing filesystem access according to filesystem security criteria, wherein the filesystem security criteria include web application-specific criteria that allow the web application to access the private filesystem through the private root directory and do not allow the web application to access a host filesystem associated with the one or more storage devices, and wherein managing the filesystem access according to the filesystem security criteria includes:

allowing access from a first module used by the web application to a file in a first region within the private filesystem and preventing access from the first module to a file in any other region within the private filesystem, and allowing access from a different, second module used by the web application to a file in a different, second region within the private filesystem and preventing access from the second module to a file in any other region within the private filesystem.

24. The computer-readable storage medium of claim 23, wherein managing the filesystem access according to the filesystem security criteria further includes:
preventing access to the private filesystem from a source that is outside a domain associated with the web application, wherein the domain of the web application corresponds to a set of webpages and modules used by the web application, and wherein the source that is outside the domain of the web application is a webpage or a module that is not used by the web application.

25. The computer-readable storage medium of claim 24, wherein the domain of the web application is defined using a tuple that includes a host, a port, and a protocol associated with the web application.

26. The computer-readable storage medium of claim 23, wherein managing the filesystem access according to the filesystem security criteria further includes:
managing the filesystem access to the private file system from one or more native code modules within a domain of the web application by enforcing respective access permissions to the private filesystem for each of the native code modules.

27. The computer-readable storage medium of claim 23, wherein the programmatic interface is a script-based interface that enables the web application to access a file in the private filesystem directly through the private root directory of the private filesystem by specifying a path to the file from the private root directory.

28. The computer-readable storage medium of claim 23, wherein the web application is executing on an operating system with a native application and wherein the method further comprises:
providing a different programmatic interface through which the native application accesses the host filesystem.

29. The computer-readable storage medium of claim 23, wherein the method further comprises:
persisting the private filesystem within the filesystem storage space between invocations of the web application on the computer.

30. The computer-readable storage medium of claim 23, wherein the programmatic interface is the only interface on the computer through which the web application accesses the private filesystem.

31. The computer-readable storage medium of claim 23, wherein managing the filesystem access according to the filesystem security criteria further includes:
allowing access from a different, third module to the file in the first region, allowing access from the third module to a file in a different, third region within the private filesystem and preventing access from the third module to a file in any region other than the first region and the third region within the private filesystem.

32. The computer-readable storage medium of claim 23, wherein the method further comprises:
defining a plurality of regions within the private filesystem, wherein the plurality of regions includes the first region and the second region, and wherein each region is defined using a respective apparent root directory;
associating the first module with the first region, wherein the first region is defined using a first apparent root directory; and
associating the second module with the second region, wherein the second region is defined using a second apparent root directory,
wherein allowing access from the first module includes allowing access to the file in the first region through the first apparent root directory, and
wherein allowing access from the second module includes allowing access to the file in the second region through the second apparent root directory.

* * * * *